(No Model.)　　　　　　　　　　　　　　　　4 Sheets—Sheet 1.
T. L. SMITH & W. S. DOIG.
FEEDER FOR NAILING MACHINES.
No. 276,639.　　　　　　　　　Patented May 1, 1883.
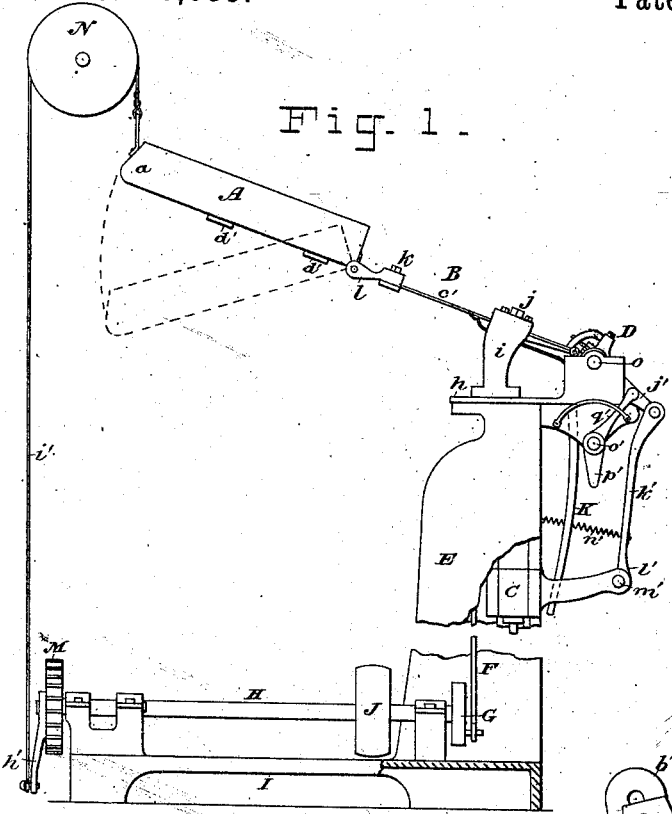
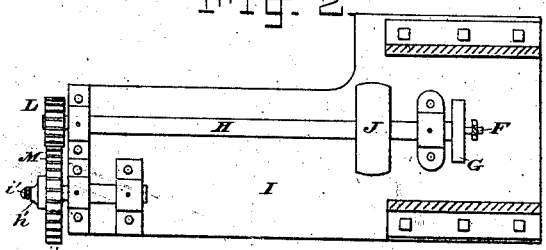
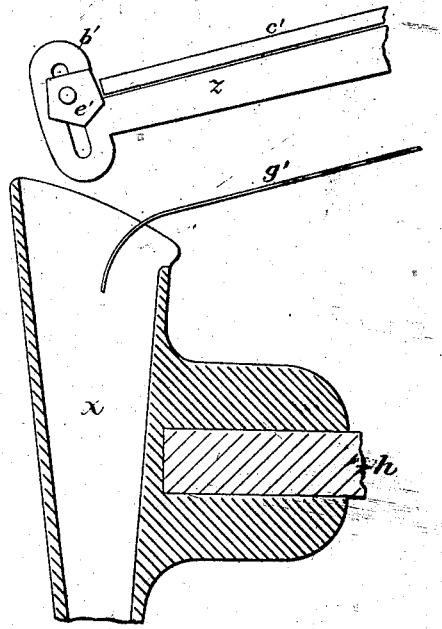
WITNESSES:
INVENTORS:
Thos. L. Smith
Wm S. Doig
By their Attorneys,
Burke Fraser Connett (No Model.)                                                  4 Sheets—Sheet 2.
T. L. SMITH & W. S. DOIG.
FEEDER FOR NAILING MACHINES.
No. 276,639.                                          Patented May 1, 1883.
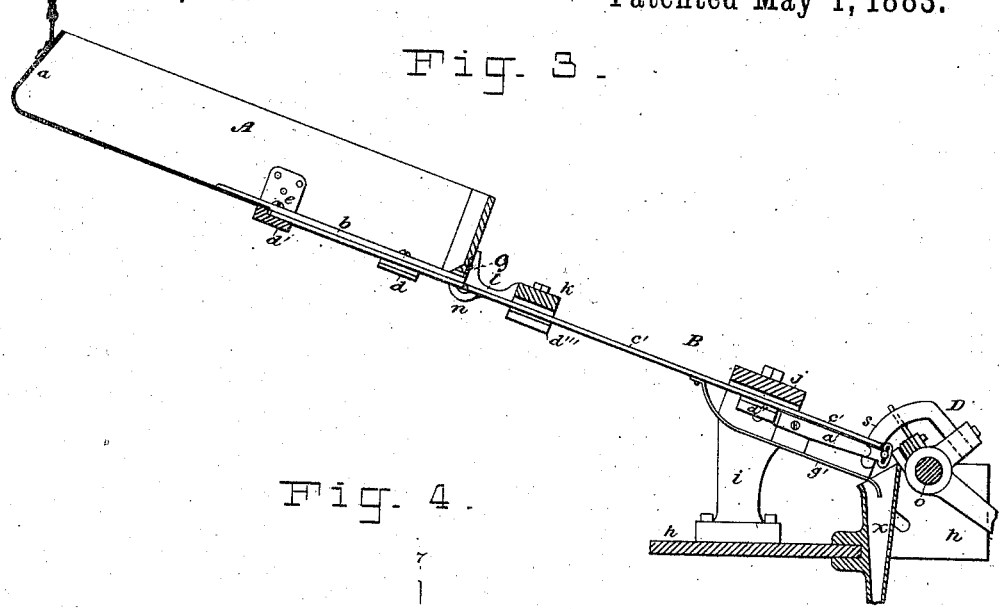
Fig. 3.
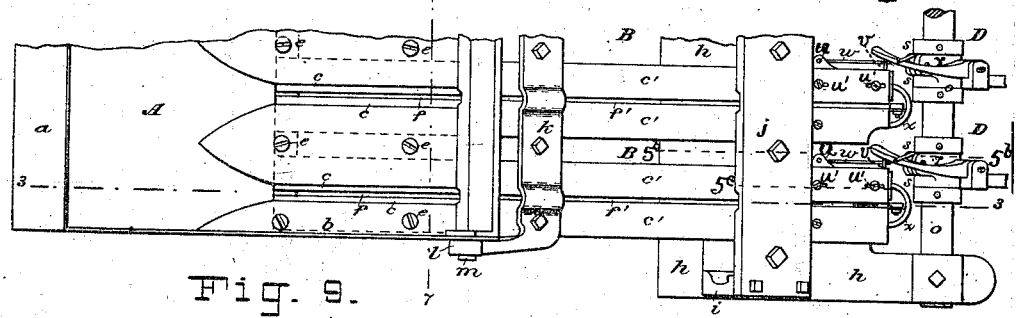
Fig. 4.
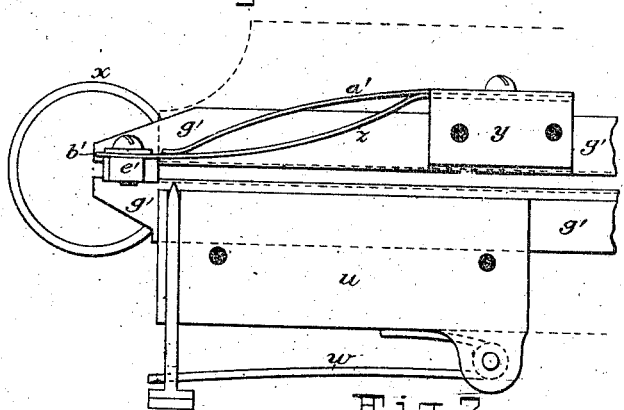
Fig. 9.
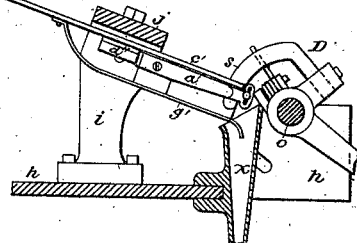
Fig. 9ᵃ.
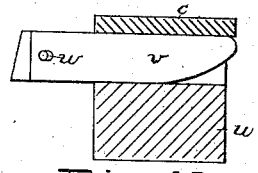
Fig. 10.
Fig. 7.
WITNESSES:                                              INVENTORS:
E. B. Bolton                                            Thos. L. Smith
Geo. Bainton                                            Wm. S. Doig
                        By their Attorneys,
                        Burke, Fraser & Connett (No Model.)
T. L. SMITH & W. S. DOIG.
FEEDER FOR NAILING MACHINES.
No. 276,639. Patented May 1, 1883.
4 Sheets—Sheet 3.
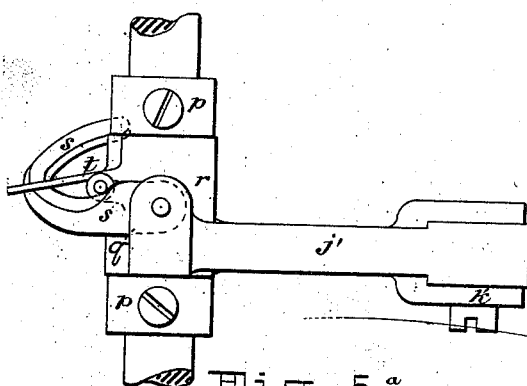
Fig. 5.
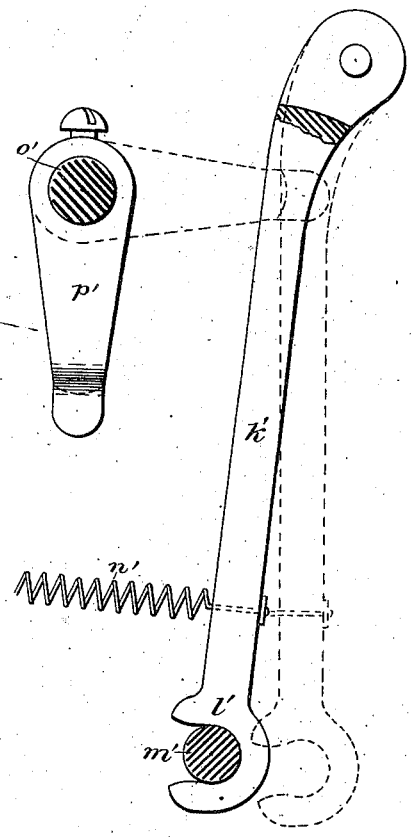
Fig. 6.
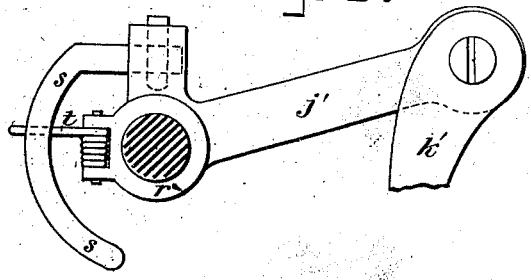
Fig. 5ª.
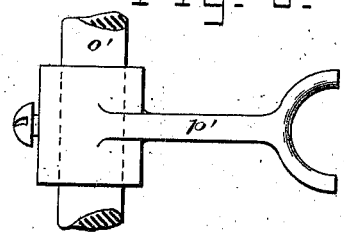
Fig. 6ª.
WITNESSES:
INVENTORS:
Thos. L. Smith
Wm. S. Doig
By their Attorneys, (No Model.)  4 Sheets—Sheet 4.
T. L. SMITH & W. S. DOIG.
FEEDER FOR NAILING MACHINES.
No. 276,639.  Patented May 1, 1883.
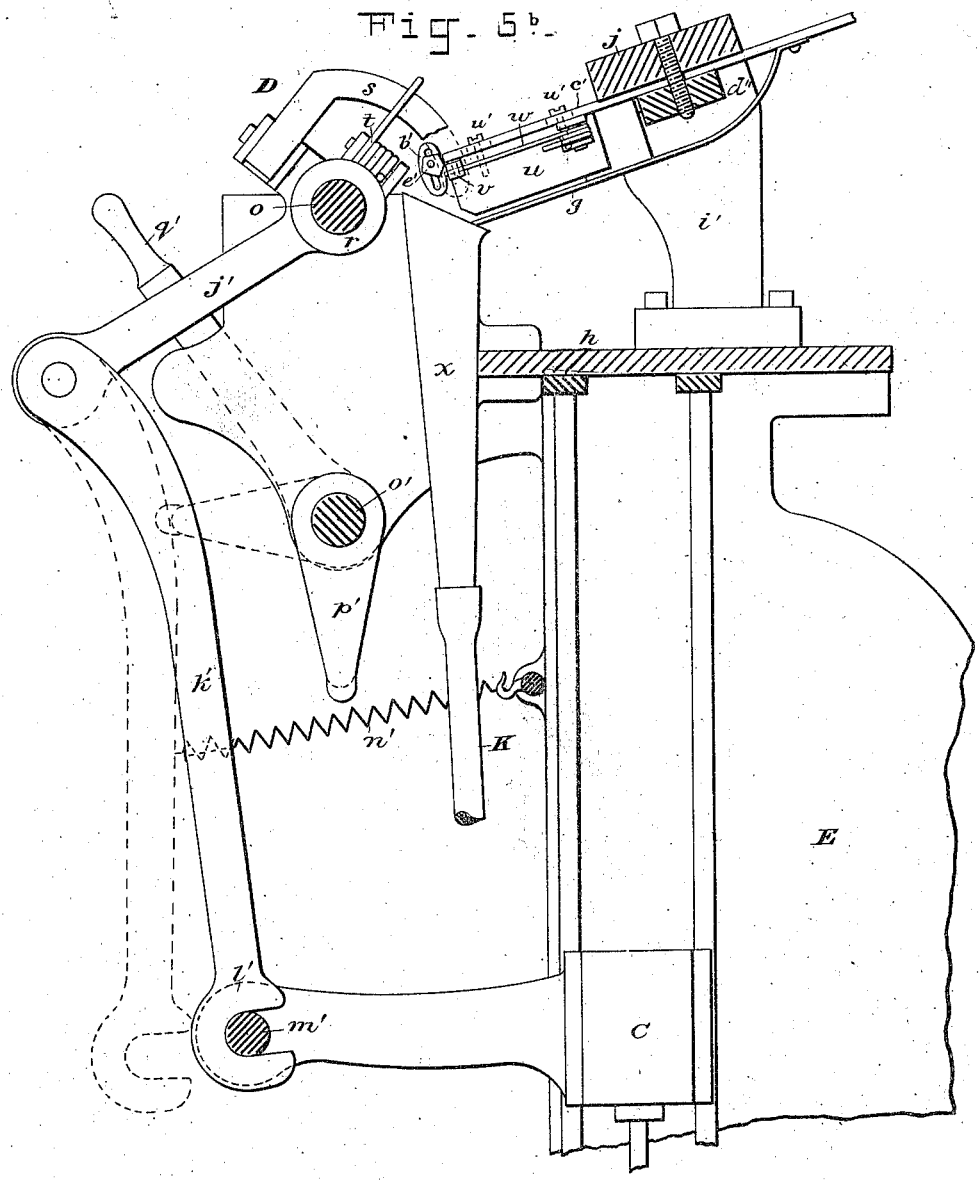
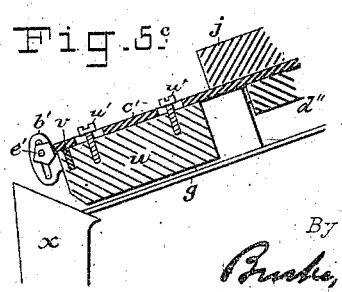
WITNESSES.
E. B. Bolton
Geo. Bainton
INVENTORS:
Thomas L. Smith
William S. Doig
By their Attorneys,
Burke, Fraser & Connett

UNITED STATES PATENT OFFICE.

THOMAS L. SMITH AND WILLIAM S. DOIG, OF BROOKLYN, NEW YORK.

FEEDER FOR NAILING-MACHINES.

SPECIFICATION forming part of Letters Patent No. 276,639, dated May 1, 1883.

Application filed October 12, 1882. (No model.)

*To all whom it may concern:*

Be it known that we, THOMAS L. SMITH and WILLIAM S. DOIG, both citizens of the United States, and residents of Brooklyn, Kings county, New York, have jointly invented certain Improvements in Automatic Feeding-Machines for Nails, Tacks, &c., of which the following is a specification.

Our invention relates to that class of feeding mechanisms which are employed on machines for nailing boxes, &c., and comprises, in the main, improvements on the machine described in our Letters Patent No. 265,166, of September, 1882.

The principal improvements in our present machine over that described in our said patent, are: the mounting of the cams which drive the pointers independently of each other and providing each with an elastic backing-spring, instead of providing one spring for all; the arrangement of said cams to be oscillated or reciprocated by direct connection with the cross-head of the box-nailing machine, whereby the employment of the pawl-and-ratchet device is dispensed with; the arrangement of the cam devices to be operated each by its own connecting-rod, and the employment of means for instantaneously disengaging any one or more of said cam devices, whereby the number of nails supplied simultaneously to the nailing-machine may be regulated; the arrangement of the track-plates so that they may be readily adjusted to suit nails or tacks of different sizes; the arrangement of a guide or track for the points of the nails, whereby the latter are prevented from crossing and are the better guided to their delivery-point; the substitution for a cam of another mechanism for actuating the tilting hopper, whereby the latter is allowed to stand in one position during the intervals between the nailing operations; the provision of adjustable slides at the outlets of the nail-hopper, in order that said outlets may be properly adjusted to suit the nail being used. This device prevents nails from working out endwise through said apertures; providing the spring-stops with adjustable heads or plates, for reasons that will be hereinafter explained; a novel construction and arrangement of the pointer for separating or pointing off the nails, whereby it is made more readily adjustable; the pivoting of the hopper on the line where the nailways from the hopper meet those of the fixed inclined platform, whereby the hopper may be tilted to any angle without producing a gap or fissure for the nails to fall into.

Other minor improvements are also embodied in this application, which will be more fully hereinafter set forth.

In the drawings which serve to illustrate our invention, Figure 1 is a general side elevation of our feeding-machine and a portion of the box-nailing machine, showing the manner of connecting the two; and Fig. 2 is a plan of the bed-plate and gearing at the base of the machine. These views are on a small scale, and do not show all the details of the feeding-machine. Fig. 3 is a vertical section of our automatic feeding-machine, taken in the plane of the line 3 3 in Fig. 4; and Fig. 4 is a plan of the same. These views are drawn to a scale about twice that of Figs. 1 and 2. Fig. 5 is a detached plan of the cam device for driving the pointer, and Fig. 5$^a$ is a side view of same, both drawn to a scale about twice that of Figs. 3 and 4. Fig. 5$^b$ is a vertical section or sectional elevation taken on line 5$^b$ 5$^b$ in Fig. 4, but on a larger scale than Fig. 4, and shows some portions of the machine not illustrated in that figure. The view is taken from the upper side of Fig. 4. Fig. 5$^c$ is a detached and fragmentary vertical section taken on line 5$^c$ in Fig. 4, but on a larger scale, the view being taken from the upper side of Fig. 4. Figs. 6 and 6$^a$ are respectively a side elevation and plan of the disengaging mechanism on the same scale as Figs. 5 and 5$^a$. Figs. 7, 8, 9, 9$^a$, and 10 are detached views, drawn to a scale about twice that of Fig. 5. These will be referred to more particularly hereinafter.

Referring especially to Figs. 3, 4, 5, and 5$^a$, A is the hopper, made preferably with an overhanging back, $a$, to better retain the nails when the hopper is tilted back or down. Fig. 7 shows a portion of the bottom of this hopper in cross-section on line 7 7 in Fig. 4. A part of the bottom of the hopper, which is generally made of sheet-iron, is left open, and this opening is spanned by beveled plates b, securely fastened to the hopper. The spaces between these plates form slots, which may be about half an inch wide. Under these beveled plates are arranged the hopper track-plates c c, which are secured adjustably to the plate b by means of clamps d and screws e at one end, their other ends resting on a recessed bar, d', on the under side of the hopper, between which and the plates b they are clamped by the screws, as shown. This construction enables us to adjust the width of the slots, tracks, or nailways for the nails to suit the thickness of the shanks of the latter. The front of the hopper is provided with suitable openings, as shown in the detached view, Fig. 10, arranged opposite the ends of the tracks or nailways f in the hopper to permit the heads of the nails to pass as the nails move out of the hopper. These apertures are provided with adjustable plates g, secured to the front of the hopper by screws, as shown in Fig. 10. These plates have niches or recesses in their lower edges, which are just large enough to permit the head of the nail to pass freely, but not large enough to permit the point of a nail to work through at the side or over it. Several sets of plates g are or may be employed having niches or recesses of different sizes to suit the heads of the various sizes of nails.

The hopper A is pivoted to the upper end of what we will designate in general as the "inclined track-platform" B, which is fixedly mounted on the box-nailing machine. The platform B comprises a bed-piece, h, on which are secured uprights i i, the tops of which are connected by a stout bar, j. To this bar are adjustably secured the inclined track-plates c', by means of clamps d'' on the under side thereof, arranged precisely like the clamps d, as shown in Fig. 7. The tracks f' between the plates c' form continuations of tracks f of the hopper. The upper ends of the outer or marginal plates c' are secured rigidly (or, if preferred, adjustably) to a tie-bar, k, which has lugs l. These lugs have pivot screws or pins m, which engage lugs n on the hopper, the pivotal axis being in the line where the plates c meet the plates c' end to end. The intermediate plates c' are connected to the bar k and held adjustably in place by clamps d''', substantially like those lettered d and d''. Recesses, as shown, are formed in the lower faces of the bars j and k, where they bridge the tracks f, in order to permit the heads of the nails to pass freely down the tracks.

We will now describe the pointer for pointing off or separating the nails, with especial reference to Figs. 4, 5, 5ᵃ, 5ᵇ, 5ᶜ, 9, 9ᵃ.

Fig. 9 is a view arranged to show the parts lying immediately under the lower ends of the track-plates c' in plan and enlarged, and Fig. 9ᵃ is a side view of the pointer on the same scale, showing the block u, in which it plays, in cross-section. This block u is secured adjustably to the plate c' by means of screws u' u', (see Fig. 5ᶜ,) which pass through slots in the plate, as clearly shown in the several figures. This plate u has a cross-groove formed in its upper face, near its end, in which rests and plays the pointer v, before mentioned, the tip of which is wedge-shaped to take between, separate, and point off the end nail of the series in the track or nailway. A spring, w, mounted on the block u, has an elastic branch, which passes through or otherwise engages the pointer, so as to keep it normally retracted.

In the base-piece h is fixedly mounted a cylindrical rod or bar, o, arranged about opposite to and parallel with the lower end of the inclined track-plate c' c'. On this bar o, at the proper distances apart, are mounted rotatively the cam devices for actuating the pointers, which devices we will designate as entireties by the letters D D. In Figs. 5 and 5ᵃ one of these devices is shown detached and enlarged. Each cam device is kept in its place on the rod by two set-collars, p, whereby it may be set or adjusted properly with respect to the pointer it is to actuate. In the boss r of this device is pivotally mounted a curved cam, s, capable of swinging back laterally on its perpendicularly-arranged pivot; and t is a spring mounted also on the boss, and having an elastic branch arranged to bear against the back of the cam s and keep it pressed normally firmly but elastically up against its bearing (at q in Fig. 5) in the boss r. The spring t is strong enough to compel the cam to drive in the pointer between the nails; but it will yield should the pointer accidentally strike a nail or be otherwise similarly impeded, and thus prevent the machine from being injured. In our former patent we provided but one spring for all the cams employed, which arrangement possessed the disadvantage of rendering all the pointers inoperative for the time when one was impeded, while in our present construction only that pointer which is impeded is rendered inoperative.

The cam device D is oscillated on the bar o by mechanism, that will be hereinafter described, and the cam s is arranged to impinge against and drive in the pointer when said cam is turned over forward by the rising of the cross-head of the nailing-machine. The pointer is thus caused to part off and discharge the end nail of the series in the track. To enable the nail to escape from the track it is necessary, however, that the tip of the pointer shall displace the spring-stop that closes the end of the track and normally prevents the nails from falling out. This stop device is best shown in Figs. 8 and 9, the former of which is an enlarged detached view, showing the spring-stop in elevation and the receiving-hopper x in vertical section.

Secured to the under side of the plate c' is a block, y, and in a groove in the outer side or face of this block are fixed, by a screw, the stop-plate z and stop-spring a'. The plate z has a slotted enlargement, b', at its extremity, and to this is adjustably secured the stop-block e', which is arranged to stand opposite the end of the track $f'$. The adjustability of this block enables it to be set so as to take under or against the head of the nail whatever may be the size of the latter, so that it will be properly dropped, point first, into the receiver, and its body and point be thrown forward, so that the pointer may properly enter behind it.

In order that the points of the nails, which depend below the plates $c'$, may be properly guided, and the nails be prevented from crossing each other when wedged back by the pointer, we provide supplementary guide-plates $g'$, (see Figs. 8 and 9,) arranged somewhat below the plates $c'$ and secured thereto. These form a lower track immediately below the track $f'$, and their ends are preferably bent down into the receiver $x$, as shown. These serve also to prevent crooked or defective nails from passing to the nailing-machine, as only straight and perfect nails can ordinarily pass through both sets of plates. If a crooked or defective nail should enter the track $f'$, it would be checked on reaching the plates $g'$, and would thus impede the movement of the nails behind. The operator would then see the difficulty and remove the impeding nail.

We will now describe the means employed for giving the cam devices D the necessary oscillatory movement, and the means whereby any predetermined number of them may be rendered inoperative for the time.

Referring most particularly to Figs. 1, 5, 5$^a$, and 6$^a$, $j'$ is an arm secured to or formed on the boss $r$ of the cam device D, and to this is coupled a connecting-rod, $k'$, which is provided (see Fig. 6) with a hook-like extremity, $l'$, arranged to engage a rigid cross rod or bar, $m'$, mounted in arms on the vertically-reciprocating cross-head C of the nailing-machine. The engagement of the rod with the bar $m'$ is maintained by a suitable spring, $n'$. This arrangement is shown in Fig. 1. It will be readily understood that as the cross-head C moves up and down the cam devices D will be oscillated on bar $o$ through the medium of rod $k'$ and arm $j'$.

In the drawings we have shown but two tracks, $f'$, and two cam devices, D, as these are sufficient to fully illustrate the principles of construction; but there may be, and usually will be, provision for delivering six or more nails simultaneously; and it is desirable that the machine may be adjusted or set to drive simultaneously any number of nails less than the whole, and that this shifting be accomplished instantaneously—as, for example, in nailing a box the operator may wish to drive six nails at one blow and four at the next, thus alternating from four to six continuously. To provide for this we connect the lower ends of the several rods $k'$ to the bar $m'$, so that they may be readily disengaged therefrom by simply pressing them back. As a convenient means of effecting the disengagement instantaneously, we mount a rock-shaft, $o'$, in some part of the machine-frame, and fix thereon (see Figs. 6 and 6$^a$) cams or wipers $p'$, which, when the shaft $o'$ is rocked, take against the rods $k'$, press them back, and disengage them. When the wipers are turned back again the springs $n'$ draw their respective rods up again into engagement with bar $m'$. On the end of the shaft $o'$ is an operating-arm, $q'$, which has, or may have, an ordinary curved guide or stop, as shown in Fig. 1. It is only necessary that the operator shall throw this arm over in order to disengage the predetermined number of cam devices D. When it is thrown back the springs $n'$ serve to again draw the hooked extremities of the rods $k'$ into engagement with bar $m'$.

Where it is not desirable to provide means for disengaging some portion of the cam devices the bar $o$, on which they are mounted, may be rotatively mounted on a shaft and be oscillated directly by a connecting-rod from the cross-head C, the cam devices in this case being fixed on said shaft $o$ by suitable means; or other equivalent means for disengaging them may be substituted for that shown.

We will now refer briefly to such parts of the box-nailing machine as are shown in Figs. 1 and 2, premising that this is a well-known machine and will require but a brief description.

E is the main frame of the box-nailing machine, on which a feeding-machine is mounted. The cross-head C, before referred to, plays vertically in this frame, being actuated by a rod, F, and crank G on the main shaft H.

I is a bed-plate, on which the shaft H is rotatively mounted, and J is the driving-pulley.

K is the tube that leads the nail from the receiver or hopper $x$ to the die or holder of the nailing-machine.

We will now describe the means employed for tilting the hopper A.

On the end of the shaft H is a toothed or other gear-wheel, L, which meshes with another gear-wheel, M, of twice its size, mounted rotatively on the bed-plate I. It will readily be seen that one revolution of shaft H, which corresponds to one reciprocation of the cross-head C, and consequently one nailing operation, will turn wheel M half-way around. On the wheel M, or its shaft, we mount a crank-arm, $h'$, and to the wrist of this crank a rope or other flexible connector, $i'$, passes over a pulley, N, mounted in hangers or otherwise, and takes hold of the rear end of the hopper A. Thus when the nailing mechanism drives one nail or set of nails the hopper is brought up to a position about parallel with the part B, as shown in Figs. 1 and 3, and at the next nailing operation it drops to the position indicated in dotted lines in Fig. 1, standing still during the interval between the nailing operations in whatever position it may happen to be. This allows time for the nails to assume their proper positions in the tracks.

It will be understood that the lower portion of the connectors $i'$ might be a rigid rod, and only the upper portion be made of flexible material.

We have described our machine just as it is represented in the drawings; but it must be understood that we do not limit ourselves to the precise construction shown, as that may be departed from in minor particulars without materially affecting the invention.

It will also be understood that the machine may be extended laterally, so as to deliver any number of nails simultaneously. It is very important that the hopper A shall be hinged or pivoted to the fixed part on the line where the track-plates of one part meet those of the other end to end. If a fissure or gap is formed here, when the hopper is tilted back nails are apt to fall into it between the ends of the track-plates, and when the hopper is lifted the machine is seriously injured. This would be likely to occur when the pointer wedges the nail back.

The stop-plate $z$, where it is provided with a backing-spring, $a'$, might be hinged or pivoted to the block $y$; or said plate might be made of elastic material itself, and the spring $a'$ be dispensed with.

We are aware that it is not new to actuate the tilting hopper of a nailing-machine directly from the cross-head by means of a connecting-rod. As the cross-head moves down and up to its resting-point with great velocity, this violent movement dashes the nails out of the hopper and the tracks therein. Consequently it has not proved successful. This we avoid by constructing the mechanism which connects the hopper with the cross-head, so as to raise the hopper at one down-and-up movement of the cross-head and to lower it at the next. The hopper thus moves at just half the speed of the cross-head, and stands at rest either in its elevated or lowered position, and not at an intermediate point. This we believe to be new.

Having thus described our invention, we claim—

1. A machine for automatically feeding nails, provided with an independent cam for actuating each of the pointers, and said cams each provided with an independent backing-spring, whereby when one of said cams and its pointer are rendered inoperative for the time the others will not be affected, all constructed and arranged to operate substantially as set forth.

2. In a machine for automatically feeding nails, the combination, with the elastically-retracted pointer, of the cam $s$, pivotally mounted in the boss $r$, and provided with a backing-spring, $t$, substantially as and for the purposes set forth.

3. The combination, in a nail-feeding machine, of a cam for actuating the pointer, the reciprocating cross-head of the nailing-machine, and a connecting-rod arranged to couple the two together, substantially as shown, whereby the movement of the said cross-head actuates the pointer, as set forth.

4. The combination, with the track-plates, of the supplementary track-plates $g'$, arranged below them to form a guide-track for the bodies of the nails, substantially as and for the purposes set forth.

5. The combination, with the stop-plate having a slotted head, $b'$, of the adjustable stop $e'$, mounted therein, substantially as and for the purposes set forth.

6. The hopper A of a nail-feeding machine, provided with nailways in its bottom and adapted to hold a mass of nails, with outlets in its front at the ends of the nailways, and also with plates $g'$, constructed as shown, and secured adjustably to the front of the hopper, whereby the outlets in the hopper may be made to suit the size of the nails being fed, as set forth.

7. In a machine for feeding nails to a nailing-machine, the tilting hopper arranged to be lowered at one nailing operation and raised at the next by means of the cross-head C of the nailing-machine and the main shaft and crank which reciprocate it, a crank, $h'$, driven from the main shaft, which drives the said cross-head C, and at half the speed of said main shaft, and a connector which couples the hopper with the said crank $h'$, whereby the said hopper is permitted to stand at rest in each position during the interval between nailing operations, substantially as set forth.

8. In a machine for automatically feeding nails and tacks to a nailing-machine, the combination of the reciprocating cross-head of the nailing-machine, the pointers, and independent cams for actuating the pointers, each cam being connected independently to the cross-head, whereby one or more of them can be disengaged from the cross-head and rendered temporarily inoperative, substantially as and for the purposes set forth.

9. The combination of the cam device D, provided with an arm, $j'$, the connecting-rod $k'$, with hooked extremity $l'$, the spring $n'$, the bar $m'$, and reciprocating cross-head C, the cam $p'$, and its shaft $o'$, all arranged to operate substantially as set forth.

10. The combination, with the slotted track-plate $c'$, of the adjustable block $u$ and the screws for attaching it to the plate, the pointer $v$, mounted to play in a groove in said block, and the retracting-spring $w$, mounted on said block $u$, all arranged substantially as set forth.

In witness whereof we have hereunto signed our names in the presence of two subscribing witnesses.

THOMAS L. SMITH.
WILLIAM S. DOIG.

Witnesses:
D. B. TREADWELL,
WILLIAM L. TREADWELL.